United States Patent [19]

Matsui

[11] Patent Number: 4,716,589
[45] Date of Patent: Dec. 29, 1987

[54] MULTIVOICE SIGNAL SWITCHING CIRCUIT

[75] Inventor: Toshiya Matsui, Tokyo, Japan
[73] Assignee: NEC Corporation, Tokyo, Japan
[21] Appl. No.: 801,714
[22] Filed: Nov. 26, 1985
[30] Foreign Application Priority Data Nov. 26, 1984 [JP] Japan .................... 59-179101[U]

[51] Int. Cl.$^4$ ............................................. H04H 5/00
[52] U.S. Cl. ......................................... 381/3; 358/144
[58] Field of Search ................. 358/143, 144; 381/2, 381/3, 4, 27, 106; 333/14

[56] References Cited

U.S. PATENT DOCUMENTS

4,389,536 6/1983 Schickedanz ..................... 381/11

Primary Examiner—Forester W. Isen
Attorney, Agent, or Firm—Sughrue, Mion, Zinn, Macpeak & Seas

[57] ABSTRACT

A multivoice signal switching circuit is incorporated in a circuit for demodulating a multivoice signal containing a main channel signal, a first subchannel signal, and a second subchannel signal, the latter two signals being treated for noise reduction. The demodulating circuit comprises a first circuit for extracting a main channel signal from the multivoice signal, a second circuit for extracting a first subchannel signal from the multivoice signal, and a third circuit for extracting a second subchannel signal. The above switching circuit receives the first and second subchannel signals and selectively outputs one of the two subchannel signals, to a decoder where the original signal is restored from the noise reduction treated signal. This signal is fed to an output circuit means together with the outputs of the first circuit, so that an audio signal is reproduced. The switch circuit has a manual switch for selecting either of the first and second subchannel signals, and is adapted to invalidate selection of the second subchannel signal by the manual switch when the second subchannel signal cannot be sensed in the multivoice signal.

24 Claims, 4 Drawing Figures

MULTIVOICE SIGNAL SWITCHING CIRCUIT

BACKGROUND OF THE INVENTION

1. Field of the Invention

The present invention relates to a switching circuit for use in multivoice signal demodulating circuit, and more specifically to a multivoice signal demodulating circuit for selectively outputting an audio signal from a multivoice signal including at least a main channel signal, a first subchannel signal and a second subchannel signal.

2. Description of Related Art

At present, in television broadcastings, multivoice signals are transmitted which include a main channel signal, a first subchannel signal and a second subchannel signal called "Second Audio Program" (SAP) signal. In this case, the sum of the left- and right-hand audio signals (L+R) and their difference (L−R) are ordinarily placed on the main channel signal and the subchannel signal, respectively, for a stereophonic sound tranmission and reproduction. In addition, the SAP signal is used to transmits a second language signal in a bilingual broadcasting.

In the above triple-audio broadcasting, the (L−R) signal and the SAP signal are respectively suppressed for noise reduction, for example, by a DBX noise reduction system which compresses the dynamic range at all levels and frequencies. Thereafter, subcarriers for the first and second subchannels are modulated by the suppressed signals, respectively, and further, are superposed on the main (L+R) channel signal so as to form a composite signal. In receivers, therefore, after the left- and right-hand signals are reproduced from the main (L+R) channel signal and the stereo subchannel (L−R) signal contained in the composite signal, and after the SAP signal is reproduced from the composite signal, it is necessary to expand the (L−R) signal and the SAP signal which have been suppressed for noise reduction.

In other words, the signal expansion processing is required for both the (L−R) signal and the SAP signal. On the other hand, the stereo sound and the second audio program (SAP) will not simultaneously listened. Therefore, "triple audio signal" demodulating circuits have been ordinarily constructed such that either the first subchannel signal or the second subchannel signal is selectively supplied to a DBX noise reduction decoder, and the signal restored to the original form by the decoder is fed to a stereo multplexer or outputted as the SAP signal.

However, the selective application of the signal to the noise reduction decoder has been determined by a manual switch. On the other hand, the television broadcasting is not ceaselessly in the form of stereophonic or SAP broadcasting, and the times of the SAP broadcasting are less than the stereophonic broadcasting. The stereophonic broadcasting is so made that it can be received as the monophonic broadcasting by the monophonic receivers, and the stereophonic television receivers are constructed such that the TV viewer can without interruption listen even if the stereophonic broadcasting is changed to the monophonic one.

However, when only the stereo signal is transmitted without the SAP signal, if the manual switch is operated to a SAP signal receiving position, no sound is outputted from the television receivers. Further, when both the stereo signal and the SAP signals are transmitted and the SAP signal is selected by a TV viewer, if the SAP program is terminated, a sound will suddenly disappear from the TV receiver. In this case, he has to operate the manual switch to a stereo broadcasting receiving position. Thus, in the TV receiver equipped with the conventional multivoice signal demodulating circuit, no sound is outputted from the termination of the SAP program to the operation of the manual switch. This would cause most TV viewers to be disoriented. In addition, the forced operation of the manual switch is troublesome to the TV viewers.

SUMMARY OF THE INVENTION

Accordingly, it is an object of the present invention to provide a multivoice signal switching circuit which can solve the above mentioned drawbacks of the conventional multivoice signal demodulating circuits.

Another object of the present invention is to provide a multivoice signal switching circuit which can be automatically changed to a condition of listening a main channel or first subchannel signal when a second subchannel signal such as the SAP signal is not transmitted or has been terminated.

Still another object of the present invention is to provide a multivoice signal switching circuit for use in demodulators capable of reproducing necessary signal from a multivoice signal containing a main channel signal and first and second subchannel signals treated for noise reduction, which circuit is capable of selecting either of the first and second subchannel signals in accordance with a manual selection when a predetermined one of the two subchannel signals is contained in the received multivoice signal, and is adapted to automatically select the subchannel signal other than the predetermined subchannel signal when the predetermined one is not contained in the received multivoice signal.

A further object of the present invention is to provide a multivoice signal demodulating circuit capable of reproducing necessary signal from a multivoice signal containing a main channel signal and first and second subchannel signals treated for noise reduction, in which circuit either the first or second subchannel signal is selected and decoded in respect of the noise reduction in accordance with a manual selection when the predetermined one of the two subchannel signals is contained in the received multivoice signal, and the subchannel signal other than the predetermined subchannel signal is automatically selected and decoded in respect of the noise reduction when the predetermined one is not contained in the received multivoice signal.

The above and other objects of the present invention are accomplished by a multivoice signal switching circuit constructed in accordance with the present invention, which comprises means receiving a control signal for selectively outputting one of first and second channel signals extracted from a multivoice signal, means for sensing the second channel signal, and means connected to the sensing means and for forcedly putting the selective output means in a condition of outputting the first channel signal irrespectively of the control signal, when the second channel signal cannot be sensed.

Further, in accordance with the present invention there is provided a circuit for demodulating a multivoice signal containing a main channel signal, a first subchannel signal, and a second subchannel signal, the latter two signals being treated for noise reduction. The demodulating circuit comprises first circuit means for extracting a main channel signal from the multivoice signal, second circuit means for extracting a first subchannel signal from the multivoice signal, third circuit means for extracting a second subchannel signal from the multivoice signal, switching circuit means receiving the first and second subchannel signals for selectively outputting one of the two subchannel signals, decoder means connected to an output of the switch circuit means to restore the original signal from the noise reduction treated signal, and output circuit means receiving the outputs of the first circuit means and the decoder means for generating an audio signal. The switch circuit means has a manual switch for selecting either of the first and second subchannel signals, and the switch circuit means is adapted to invalidate selection of the second subchannel signal by the manual switch when the second subchannel signal cannot be sensed in the multivoice signal.

With the above circuit construction, when the second subchannel signal is not transmitted or has been terminated, the switch circuit means operates to invalidate the selection of the second subchannel signal by the manual switch. Therefore, even if the manual switch is in or is brought into a second subchannel selection position, the circuit is automatically set so as to output the first subchannel signal.

The above and other objects, features and advantages of the present invention will be apparent from the following description of preferred embodiments of the invention with reference to the accompanying drawings.

DESCRIPTION OF THE PREFERRED EMBODIMENT

Figure 1:
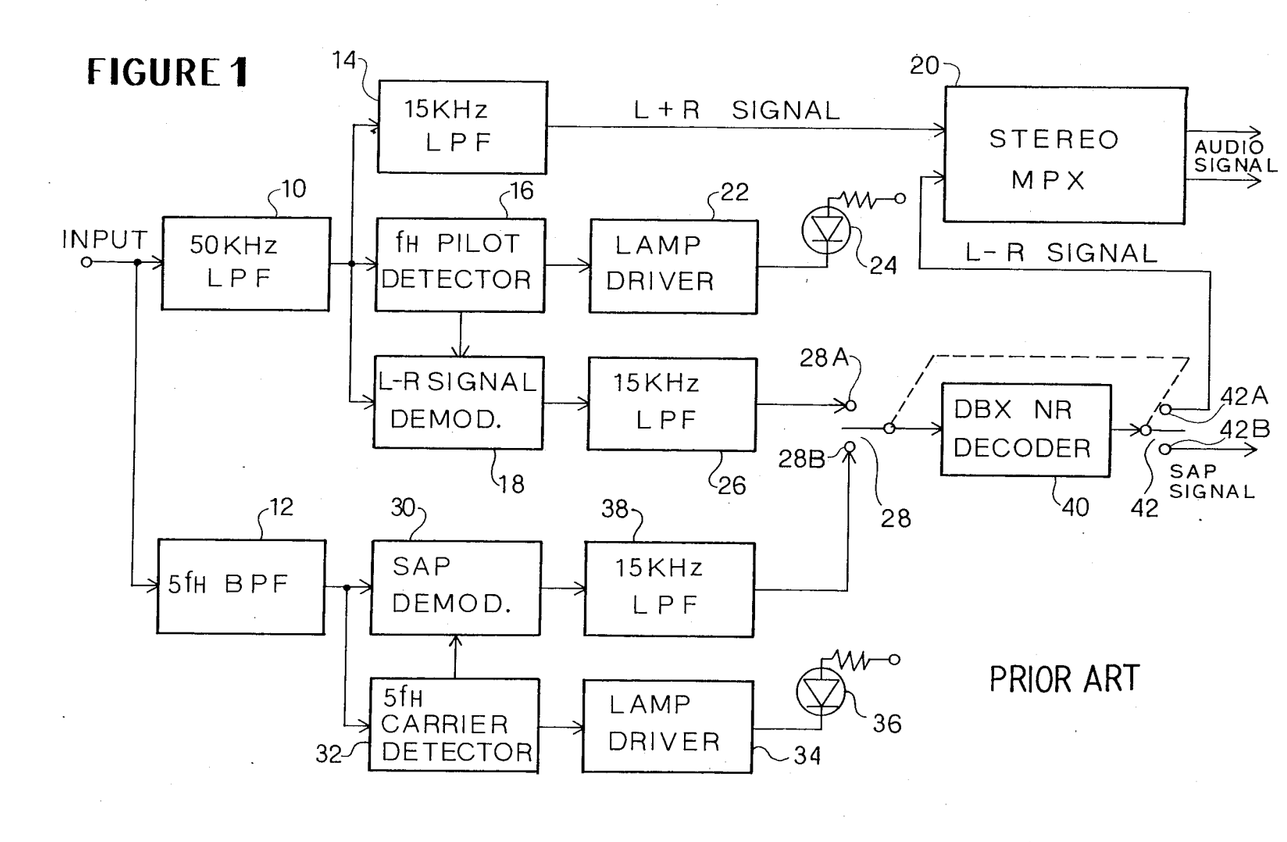
FIG. 1 is a block diagram showing a conventional multivoice signal demodulating circuit.

Referring to FIG. 1, there is shown a conventional circuit for demodulating the multivoice signal containing the main (L+R) channel signal, the first subchannel (L−R) signal and the second subchannel (SAP) signal, the two subchannel signals being compressed in the DBX noise reduction method. The shown demodulating circuit comprises a multivoice signal input terminal connected to a low pass filter 10 and a bandpass filter 12. The low pass filter 10 has the cutoff frequency of 50 KHz so as to extract from the input signal a stereo composite signal including a base band (L+R) signal and a first subcarrier carrying the (L−R) signal. On the other hand, the bandpass filter 12 has the center frequency of $5f_H$ (where $f_H$ is the frequency of a horizontal synchronizing signal), so that a second subcarrier carrying the SAP signal is extracted from the input multivoice signal.

The low pass filter 10 has an output connected to another low pass filter 14, a $f_H$ pilot detector 16 and a (L−R) signal demodulator 18. The low pass filter 14 has the cutoff frequency of 15 KHz so as to supply only the (L+R) signal to a (L+R) input of a stereo multiplexer 20 which functions as a stereo decoder.

The $f_H$ detector 16 detects the pilot signal of frequency $f_H$ (15.734 KHz) and outputs a stereo indication signal to a lamp driver 22 so as to cause it to light an associated LED diode 24. At the same time, the pilot detector 16 generates pulses having the same pulse repetition frequency as the frequency $2f_H$ (31.468 KHz) of the first subcarrier and in synchronism with the pilot signal. The pulses are supplied to the (L−R) signal demodulator 18. To the contrary, when the pilot signal cannot be detected, no stereo indication signal is fed to the lamp driver 22, and so, the LED diode 24 is not energized. In addition, the above mentioned pulses are not supplied to the (L−R) signal demodulator.

With reference to the pulses of $2f_H$, the (L−R) signal demodulator 18 detects the stereo composite signal to reproduce the compressed (L−R) signal, which is in turn outputted through a 15 KHz low pass filter 26 to one input terminal 28A of a stereo/SAP manual switch 28. Incidentally, the low pass filter 26 can be omitted.

On the other hand, the bandpass filter 12 has an output connected to respective inputs of a SAP signal demodulator 30 and a $5f_H$ carrier detector 22. This $5f_H$ carrier detector 32 operates to detect the second subcarrier of the frequency $5f_H$ (78.67 KHz). When the second subcarrier is detected, the carrier detector 32 generates an SAP indication signal to a lamp driver 34, so that a LED diode 36 is energized by the driver 34. Further, the carrier detector 32 produces a carrier signal of $5f_H$, i.e., 78.67 KHz to the SAP signal demodulator 30. However, when the $5f_H$ subcarrier is not detected, it does not output the SAP indication signal, and so, the LED diode 36 is not lighted. In addition, no $5f_H$ carrier signal is supplied to the SAP signal demodulator 30.

This SAP signal demodulator 30 detects the output signal of the $5f_H$ bandpass filter 12 by the carrier signal of $5f_H$ (78.67 KHz) so as to reproduce the compressed SAP signal, which is then fed through a 15 KHz low pass filter 38 to the other input terminal 38B of the stereo/SAP manual switch 28. The low pass filter 38 can be omitted, similarly to the filter 26.

The stereo/SAP manual switch 28 has a common terminal connected to an input of a DBX noise reduction decoder 40. Therefore, this decoder 40 operates to expand the (L−R) signal or the SAP signal outputted from the manual switch 28, which signals are compressed in the DBX noise reduction method. The expanded (L−R) or SAP signal is connected to a common terminal of another stereo/SAP manual switch 42, whose one fixed terminal 42A is connected to a (L−R) input of the stereo multiplexer 20. The other fixed terminal 42B of the switch 42 constitutes an SAP signal output terminal.

The two switches 28 and 42 are interlocked by a broken line in FIG. 1, so that the fixed terminal 28A is selected in the switch 28 when the fixed terminal 42A is selected in the switch 42.

In the above mentioned multivoice signal demodulator, when only the stereo signal is transmitted without the SAP signal, if the manual switches 28 and 42 are operated to the SAP signal receiving positions 28B and 42B, no sound is outputted from the television receiver. Further, when both the stereo signal and the SAP signal are transmitted and the SAP signal is selected by a TV viewer, if the SAP program has been terminated, a sound will suddenly disappear from the TV receiver. In this case, he has to operate the manual switches 28 and 42 to a stereo broadcasting receiving positions 28A and 42A.

Figure 2:
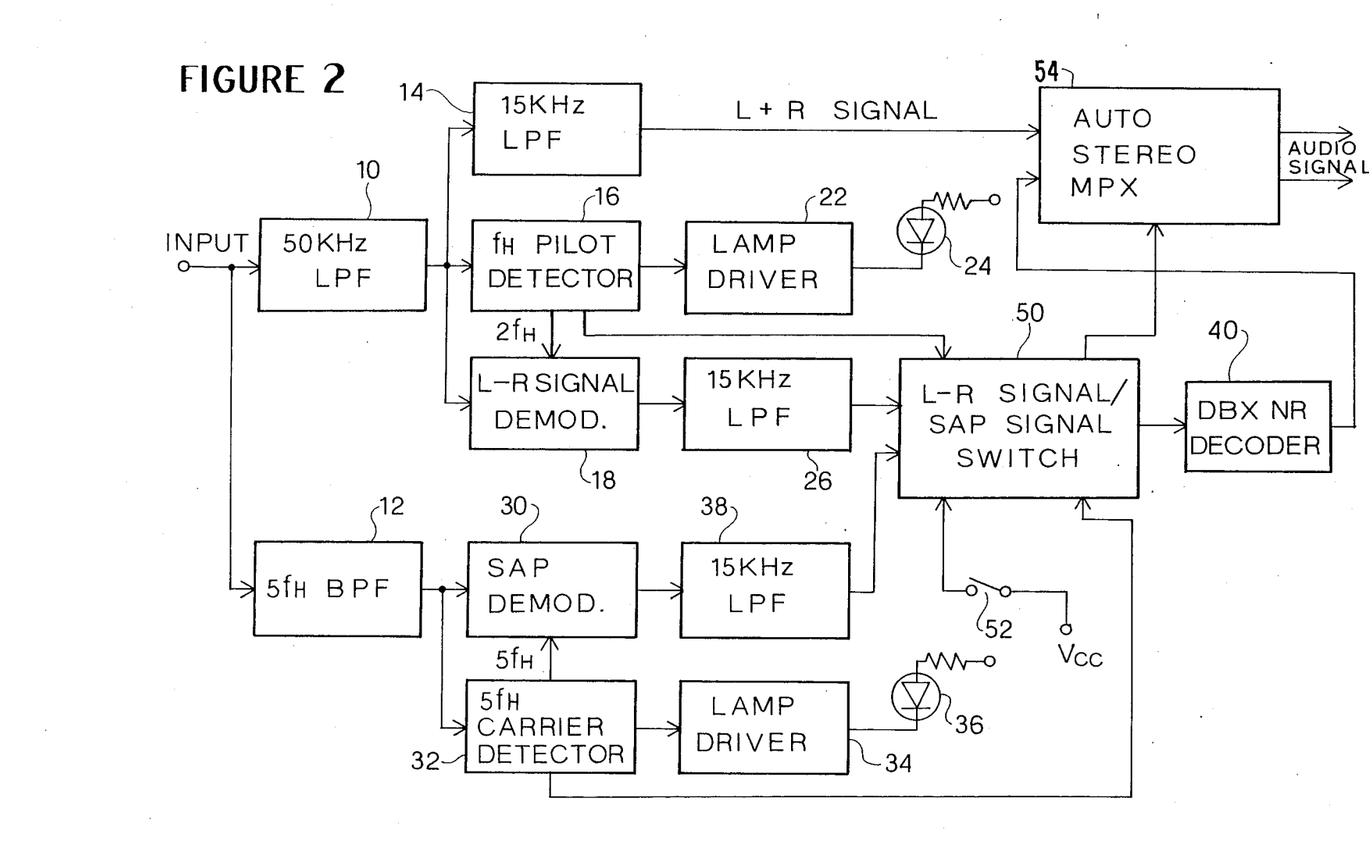
FIG. 2 is a block diagram showing a multivoice signal demodulating circuit incorporating one embodiment of the switching circuit in accordance with the present invention.

Turning to FIG. 2, there is shown one embodiment of a multivoice signal demodulating circuit incorporating an switching circuit in accordance with the present invention. In FIG. 2, elements similar to those of the circuit shown in FIG. 1 are given the same Reference Numerals, and their explanation will be omitted.

As will be apparent from the comparison between FIGS. 1 and 2, the circuit shown in FIG. 2 comprises an analog switch circuit 50 in place of the stereo/SAP manual switches 28 and 42, and the switch circuit 50 is associated with a manual switch 52. In addition, an auto-switching stereo multiplexer 54 is used instead of the stereo multiplexer 20.

The analog switch circuit 50 has two inputs connected to the outputs of the low pass filters 26 and 38, respectively, and is controlled to select a manual switch operation or an auto-switching operation on the basis of the reception indication signals from the $f_H$ pilot detector 16 and the $5f_H$ carrier detector 32.

Specifically, when the reception indication signal from the $5f_H$ carrier detector 32 indicates that the SAP signal is received, the analog switch circuit 50 operates to couple the input of the DBX noise reduction decoder 40 to one of the low pass filters 26 and 38 which is designated by the manual switch 52. On the other hand, when the SAP signal is not received, the analog switch circuit 50 operate to connect the output of the filter 26 to the DBX noise reduction decoder 40, irrespectively of the condition of the manual switch 52. Namely, in this case, the selection by the manual switch is invalidated.

The auto-switching stereo multiplexer 54 is controlled by the analog switch circuit 50 to perform the ordinary stereo demodulation when the stereo (L−R) signal is selected by the analog switch circuit 50, so that the L and R signals are respectively outputted from a pair of audio outputs of the multiplexer 54. If the SAP signal is selected by the switch circuit 50, the multiplexer 54 is controlled to output the SAP signal from both the pair of audio outputs. Furthermore, the multiplexer 54 is also controlled by the reception indication signal of the $f_H$ pilot detector 18 which is supplied through the analog switch circuit 50. Namely, when the output of the filter 26 is selected by the analog switch circuit 50, if the television audio signal is a monophonic signal, the multiplexer operates to output the (L+R) signal from the filter 14 to both the pair of audio outputs.

Thus, the multivoice signal demodulating circuit as shown in FIG. 2 operates as follow:

(a) When both the stereo signal and the SAP signal are transmitted, a desired signal is selected from between the stereo and SAP signals by the operation of the manual switch 52.

(b) When only the SAP signal is transmitted as the subchannel signal, i.e., when the monophonic signal and the SAP signal are transmitted, a desired signal is selected from between the monophonic and SAP signals by the operation of the manual switch 52.

(c) When only the stereo signal is transmitted and the SAP signal is not transmitted, the stereo signal is selected without regard to the condition of the manual switch 52. Namely, the (L−R) signal output of the filter 26 is inputted to the DBX noise reduction decoder 40 by the analog switch circuit 50, and the (L+R) signal and the expanded (L−R) signal are applied to the stereo multiplexer 54 so that it outputs the L and R signals from the pair of audio output terminals.

(d) When only the monophonic signal is transmitted and the SAP signal is not transmitted, the output of the filter 26 is connected to the DBX noise reduction decoder 40 by the analog switch circuit 50, but since it does not include the (L−R) signal, only the (L+R) signal is applied to the stereo multiplexer 54. Therefore, the (L+R) signal, i.e., the monophonic signal is supplied from the pair of audio output terminals of the multiplexer.

Figure 3:
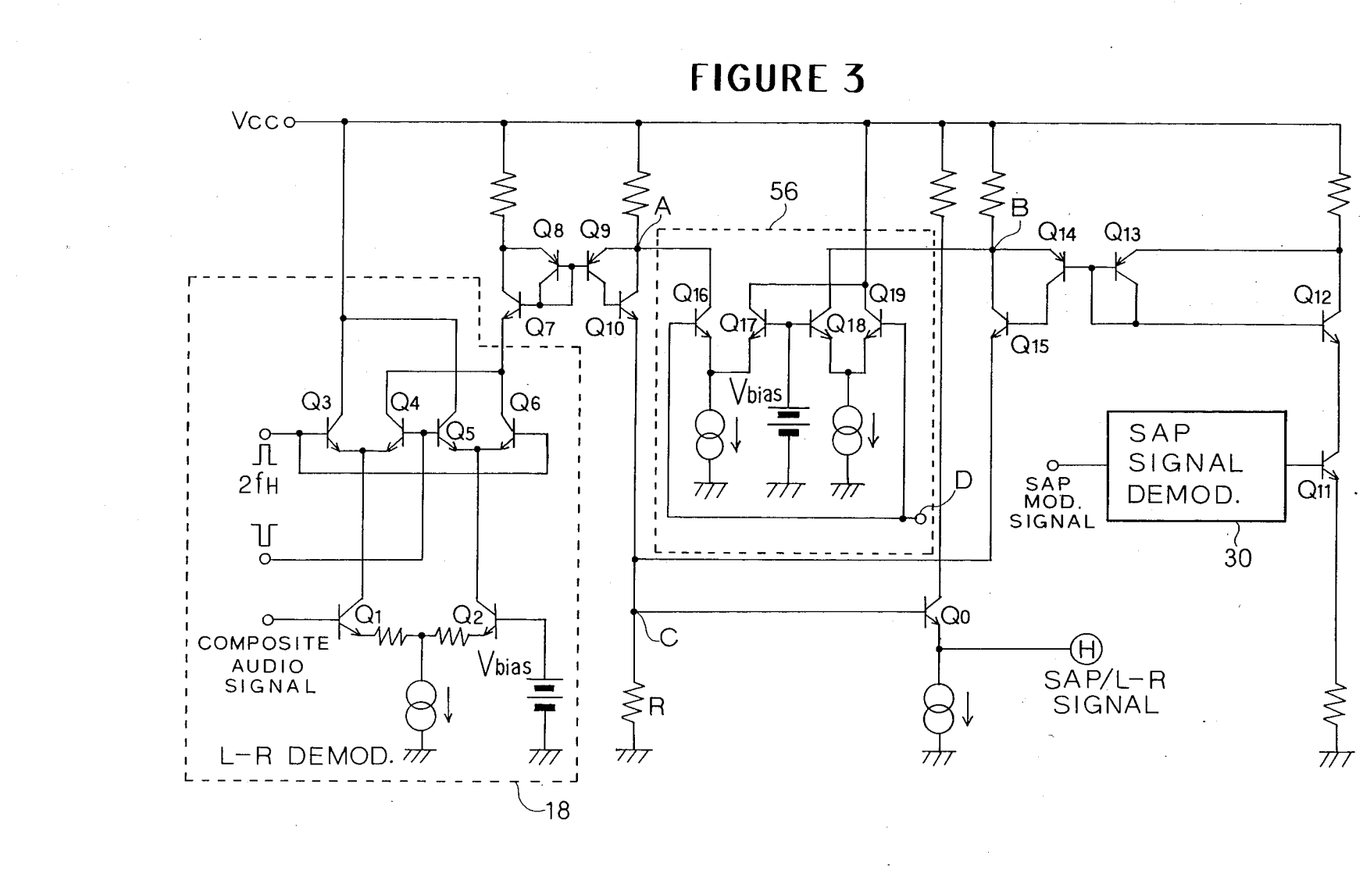
FIG. 3 is a circuit diagram showing the (L−R) signal demodulator and the (L−R)/SAP signal switching circuit shown in FIG. 2.

Referring to FIG. 3, there is shown one example of the (L−R) signal demodulator 18 and the analog switch circuit 50.

The (L−R) signal demodulator 18 includes a transistor $Q_1$ having a base connected to the output of the low pass filter 10, and another transistor $Q_2$ whose base is connected to a bias voltage $V_{bias}$. Emitters of these transistors $Q_1$ and $Q_2$ are respectively connected through resistors to a common constant current source. A collector of the transistor $Q_1$ is connected to common connected emitters of transistors $Q_3$ and $Q_4$, while a collector of the transistor $Q_2$ is connected to common connected emitters of transistors $Q_5$ and $Q_6$.

Of the transistors $Q_3$, $Q_4$, $Q_5$ and $Q_6$, the transistors $Q_3$ and $Q_6$ have common-connected bases, which receive non-inverted pulses of the frequency $2f_H$ from the $f_H$ pilot detector 16. The transistors $Q_4$ and $Q_5$ also have common-connected bases which are supplied with inverted pulses of the frequency $2f_H$. Collectors of the transistors $Q_3$ and $Q_4$ are common-connected to a DC source voltage $V_{cc}$, and collectors of the transistors $Q_4$ and $Q_6$ are also common-connected to the DC source voltage $V_{cc}$ through a resistor and an active load including a pair of transistors $Q_7$ and $Q_8$ connected in the form of a Darlington circuit.

As seen from the above, the (L−R) signal demodulator 18 is in the circuit form of a double balanced differential amplifier.

The Darlington circuit consisting of the transistors $Q_7$ and $Q_8$ is connected to another Darlington circuit composed of transistors $Q_9$ and $Q_{10}$, so that a current mirror circuit is formed.

On the other hand, the SAP signal demodulator 30 receiving the SAP modulation signal from the $5f_H$ bandpass filter 12, is formed by for example a frequency modulation detector, and is connected at its output to a base of a transistor $Q_{11}$. This transistor $Q_{11}$ has an emitter grounded through a resistor and a collector connected to the DC source voltage $V_{cc}$ through a resistor and an active load formed by a Darlington circuit of transistors $Q_{12}$ and $Q_{13}$. This Darlington circuit is connected to another Darlington circuit having a pair of transistors $Q_{14}$ and $Q_{15}$, so that a current mirror circuit is formed.

In the two current mirror circuits mentioned above, emitters of the transistors $Q_{10}$ and $Q_{15}$ are common-connected to a ground resistor R, and also to a bases of an output transistor $Q_0$. This output transistor has a collector connected through a resistor to the DC source voltage $V_{cc}$, and an emitter of the transistor $Q_0$ is connected to a constant current source so as to form an emitter follower. Therefore, this emitter of the transistor is connected to an output terminal H.

Further, as shown in FIG. 3, the collectors of the transistors $Q_9$, $Q_{10}$ and $Q_{14}$, $Q_{15}$ of the two current mirror circuits are connected to a balanced differential circuit type of switch circuit 56 which comprises four transistors $Q_{16}$, $Q_{17}$, $Q_{18}$ and $Q_{19}$ connected as shown. Namely, a collector of the transistor $Q_{16}$ is connected to a point A, i.e., the collectors of the transistors $Q_9$ and $Q_{10}$, and a collector of the transistor $Q_{18}$ is connected to a point B, i.e., the collectors of the transistors $Q_{14}$ and $Q_{15}$. Collectors of the remaining transistors $Q_{17}$ and $Q_{19}$ are common-connected to the DC source voltage $V_{cc}$.

In addition, the transistors $Q_{16}$ and $Q_{19}$ are common-connected at their bases, which are connected to a switching control input terminal D. On the other hand, the transistors $Q_{17}$ and $Q_{18}$ have their bases common-connected to a biasing voltage $V_{bias}$. Emitters of the transistors $Q_{16}$ and $Q_{17}$ are connected to a constant current source, while emitters of the transistors $Q_{18}$ and $Q_{19}$ are connected to another constant current source.

The circuit as shown in FIG. 3 operates as follows:

The (L−R) signal demodulator 18 in the form of the double balanced differential amplifier demodulates the composite signal from the low pass filter 10 on the basis of the pulses of the frequency $2f_H$ from the $f_H$ pilot detector 16, so as to reproduce the (L−R) signal carried on the subcarrier of the frequency $2f_H$. This reproduced (L−R) signal flows through the active load formed by the Darlington circuit including the transistors $Q_7$ and $Q_8$. As the result of the current mirror effect, a similar current flows through the Darlington circuit composed of the transistors $Q_9$ and $Q_{10}$, so that the (L−R) signal voltage appear across the grounding resistor R, and therefore, is applied to the base of the output transistor $Q_0$.

On the other hand, the SAP signal reproduced by the SAP signal demodulator is applied to the base of the transistor $Q_{11}$ so as to produce the corresponding collector current flowing through the transistor $Q_{11}$. As a result, the SAP signal current flows through the active load composed of the Darlington circuit including the transistors $Q_{12}$ and $Q_{13}$, and due to the current mirror effect a similar current flows through the Darlington circuit of the transistors $Q_{14}$ and $Q_{15}$. Therefore, the SAP signal voltage appears across the grounding resistor R and is applied to the base of the output transistor $Q_0$.

Thus, the (L−R) signal and the SAP signal are collided at a point C, i.e., at the base of the output transistor $Q_0$. But, this collision is prevented by the balanced differential circuit type switch circuit 56, and also, one of the two signals is selectively applied to the transistor $Q_0$.

Namely, when the bases of the transistors $Q_{16}$ and $Q_{19}$, i.e., the switching control input D is applied with a voltage higher than the biasing voltage of the transistors $Q_{17}$ and $Q_{18}$ (SAP mode), the transistors $Q_{16}$ and $Q_{19}$ are turned on, while the transistors $Q_{17}$ and $Q_{18}$ are maintained in an OFF condition. Therefore, since the point A is grounded through the transistor $Q_{16}$, the (L−R) signal does not flow through the transistor $Q_{10}$, and accordingly, does not appear on the point C. On the other hand, since the point B is not grounded, the SAP signal flows through the transistor $Q_{15}$ and appears on the point C. Therefore, only the SAP signal is outputted through transistor $Q_0$ to the terminal D.

If the switching control input D is applied with a voltage lower than the biasing voltage of the transistor $Q_{17}$ and $Q_{18}$ (stereo mode), the transistors $Q_{17}$ and $Q_{18}$ are turned on, and the transistors $Q_{16}$ and $Q_{19}$ are brought into an OFF condition. Therefore, since the point B is grounded through the transistor $Q_{18}$, the SAP signal is applied to the point C. Accordingly, only the SAP signal is applied to the point C and then outputted through the transistor $Q_0$.

In the operation as mentioned above, either the (L−R) signal or the SAP signal is selectively outputted from the terminal D.

Figure 4:
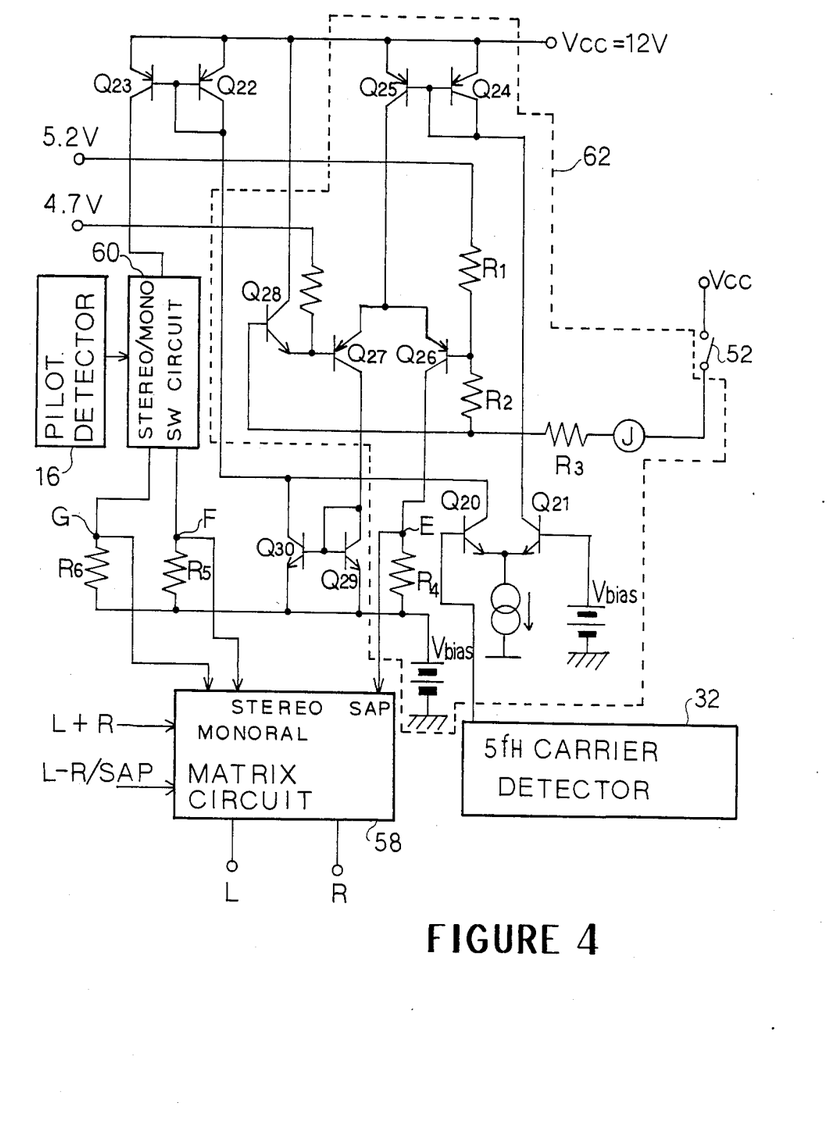
FIG. 4 is a circuit diagram showing the auto-switching stereo multiplexer shown in FIG. 2 and a circuit for generating a control signal which is supplied to the switching circuit shown in FIG. 3.

Turning to FIG. 4, there is shown one example of the auto-switching stereo multiplexer 54 shown in FIG. 2 and an associated circuit for generating a switching control signal which is supplied to the terminal D of the switch circuit 56 shown in FIG. 3 and to the auto-switching stereo multiplexer.

The SAP indication signal output of the $5f_H$ carrier detector 32 is connected to a base of a transistor $Q_{20}$. As seen from the drawing, this transistor $Q_{20}$ is connected to another transistor $Q_{21}$ to form a differential circuit. The base of the transistor $Q_{21}$ is connected to a constant bias voltage $V_{bias}$, and emitters of these transistors $Q_{20}$ and $Q_{21}$ are common-connected and grounded through a constant current source. A collector of the transistor $Q_{20}$ is connected to a DC source voltage $V_{cc}$ through a transistor $Q_{22}$ which is connected to a transistor $Q_{23}$ to form a current mirror circuit. On the other hand, a collector of the transistor $Q_{21}$ is connected to the DC source voltage $V_{cc}$ through a transistor $Q_{24}$ connected to a transistor $Q_{25}$ to form another current mirror circuit.

The shown circuit includes a stereo/SAP switch terminal J connected through the manual switch 52 to the DC source voltage $V_{cc}$. This terminal J is also connected through series-connected resistors $R_1$, $R_2$ and $R_3$ to a first biasing voltage such as 5.2 V. The connection between the resistors $R_1$ and $R_2$ is connected to a base of a transistor $Q_{26}$, which is connected to a transistor $Q_{27}$ as shown in FIG. 4 to form a differential circuit. Emitters of these transistors $Q_{26}$ and $Q_{27}$ are common-connected to the collector of the transistor $Q_{25}$. The collector of the transistor $Q_{26}$ is connected through a resistor $R_4$ to a bias voltage $V_{bias}$, and also connected to an SAP selection input of a stereo matrix circuit 58.

The collector of the transistor $Q_{27}$ is connected to the same bias voltage $V_{bias}$ through a transistor $Q_{29}$, which is connected to a transistor $Q_{30}$ to form a current mirror circuit. A collector of the transistor $Q_{30}$ is connected to the collector of the transistor $Q_{20}$. Thus, the transistor $Q_{22}$ and hence the transistor $Q_{23}$ are brought into ON condition if either the transistor $Q_{20}$ or $Q_{30}$ is rendered conductive.

The base of the transistor $Q_{27}$ is connected through a resistor to a second bias voltage such as 4.7 V, and also connected to an emitter of a transistor $Q_{28}$. This transistor 28 is connected at its collector to the DC source voltage $V_{cc}$ and at its base to the connection between the resistors $R_2$ and $R_3$.

The collector of the transistor $Q_{23}$ is connected to a stereo/monophonic switch circuit 60 which is adapted to receive the stereo indication signal output of the $f_H$ pilot detector 16. This stereo/monophonic switch circuit 60 has a stereo output connected through a resistor $R_5$ to the bias voltage $V_{bias}$ and also connected to a stereo selection input of the stereo matrix circuit 58. The switch circuit 60 further has a monophonic output connected through a resistor R6 to the bias voltage V*bias* and also coupled to a monophonic selection input of the stereo matrix circuit 58.

The stereo matrix circuit 58 has a (L+R) input connected to the low pass filter 14 and a (L−R)/SAP input connected to the output of the DBX noise reduction decoder 40. Further, the matrix circuit 58 has a pair of audio outputs L and R. When the SAP selection input is put at a high voltage level, the matrix circuit 58 operates to output from the pair of audio outputs L and R the SAP audio signal which is supplied to the (L−R)/SAP input. When the SAP selection input is at a low voltage level and the stereo selection input is brought to a high voltage level, it operates to reproduce left- and right-hand audio signals from the (L+R) signal and (L−R) signal and then to output these left- and right-hand audio signals to the pair of audio outputs L and R. In addition, when the monophonic selection input is applied with a high voltage level, the matrix circuit 58 operates to output from the pair of audio outputs L and R the same (L+R) signal supplied to the (L+R) input.

In the above mentioned circuit, when the manual switch 52 is closed, the stereo/SAP switch terminal J is rendered to the DC source voltage $V_{cc}$ (SAP mode). At this time, the bases of the transistors $Q_{26}$ and $Q_{27}$ are respectively applied with bias voltages expressed as follows:

$$V_{BQ26} = \frac{V_{cc} - 5.2}{R_1 + R_2 + R_3} \times R_1 + 5.2 \text{ (V)}$$

$$V_{BQ27} = \frac{V_{cc} - 5.2}{R_1 + R_2 + R_3} \times (R_1 + R_2) + 5.2 - V_{BEQ28} \text{ (V)}$$

where $V_{BQ26}$ is the base voltage of the transistor $Q_{26}$;
$V_{BQ27}$ is the base voltage of the transistor $Q_{29}$; and
$V_{BEQ28}$ is the base-emitter voltage of the transistor $Q_{28}$.

At this time, the resistances of the resistors $R_1$, $R_2$ and $R_3$ are determined to establish the relation $V_{BQ26} << V_{BQ27}$. For example, assuming that $R_1 = R_2 = 5K\Omega$ and $R_3 = 10K\Omega$, the relation of $V_{BQ26} = 6.9$ V and $V_{BQ26} = 7.9$ V can be obtained under the condition of $V_{cc} = 12$ V.

Under this condition, the transistor $Q_{27}$ is off and the transistor $Q_{26}$ is ON. Namely, most of the current flowing through the transistor $Q_{25}$ will flow through the transistor $Q_{26}$, so that the potential at the point E become high. As a result, the high voltage level is applied to the SAP selection input of the matrix circuit 58, so as to instruct the selection of the SAP mode.

The current flowing through the transistor $Q_{25}$ is controlled through the transistor $Q_{24}$ by the differential circuit constituted of the transistors $Q_{20}$ and $Q_{21}$. Now, assuming that the SAP indication signal from the $5f_H$ carrier detector 32 is at a low level (SAP signal reception), the transistor $Q_{20}$ is OFF and the transistor $Q_{21}$ is ON. At this time, therefore, the transistor $Q_{25}$ is put in a condition of supplying the sufficient current to the transistors $Q_{26}$ and $Q_{27}$. But, when the SAP signal is not received and then the $5f_H$ carrier detector outputs a signal having a voltage sufficiently higher than the base bias voltage of the transistor $Q_{21}$, the transistor $Q_{20}$ is turned on and the transistor $Q_{21}$ becomes off. Accordingly, a current does not flow through the transistor $Q_{26}$ irrespectively of the condition of the stereo/SAP manual switch 52. On the other hand, since the transistor $Q_{20}$ is in ON condition, the transistor $Q_{22}$ is put in ON condition, and therefore, the transistor $Q_{23}$ is brought into a condition capable of supplying a current to the stereo/monophonic switch circuit 60. Accordingly, even if the manual switch 52 is operated to select the SAP mode, the stereo mode or the monophonic mode is selected by the switch circuit 60.

When the stereo mode is selected, the point F takes a high potential. On the other hand, when the monophonic mode is selected, the point G becomes a high potential. As mentioned above, the matrix circuit 58 determines the operation mode on the bases of the potentials at the points E, F, and G.

When the manual switch 52 is opened to put the stereo/SAP switch terminal J in a floating condition, the base potential of the transistor $Q_{26}$ is brought to about 5.2 V, and the transistor $Q_{27}$ takes the base bias of about 4.7 V. In this condition, the transistor $Q_{27}$ is turned on and the transistor $Q_{26}$ is turned off. At this time, if the transistor $Q_{25}$ is in ON condition (the SAP signal reception condition), the current flows through the transistor $Q_{29}$. As a result, the current is supplied through the transistor $Q_{23}$ to the switch circuit 60, so that it takes either the stereo mode or the monophonic mode in accordance with the output of the detector 16. In addition, when the transistor $Q_{25}$ is put in OFF condition (i.e., when the SAP signal is not received), the transistor $Q_{29}$ is not supplied with the current from the transistor $Q_{27}$. However, since the transistor $Q_{22}$ is rendered conductive by the transistor $Q_{20}$, so that the current flows the transistor $Q_{23}$ so as to put the switch circuit 60 in an operable condition.

As will be apparent from the above explanation, a stereo/SAP switching operation can be achieved by connecting the point E to the switch control terminal D of the switch circuit 56 shown in FIG. 3 and connecting the DBX noise reduction decoder 40 between the output H of the FIG. 3 circuit and the (L−R)/SAP input of the matrix circuit 58.

As seen from the above, the transistors $Q_{20}$, $Q_{21}$, $Q_{24}$, $Q_{25}$, $Q_{26}$, $Q_{27}$ and $Q_{28}$ and the associated passive elements and voltage sources, surrounded by a dotted line in FIG. 4, constitutes a circuit for generating a switch control signal to be supplied to the switch control input D of the switch circuit 56 shown in FIG. 3.

The invention has thus been shown and described with reference to specific embodiments. However, it should be noted that the invention is in no way limited to the details of the illustrated structures but changes and modifications may be made withi the scope of the appended claims.

I claim:

1. A multivoice signal switching circuit for treating a multivoice signal including a main channel and first and second subchannels, the first subchannel being assigned to stereophonic information and the second subchannel being assigned to second language information, comprising means receiving a control signal for selectively outputting one of the first and second subchannel signals extracted from said multivoice signal, means for sensing the second subchannel signal, and means connected to the sensing means and for controlling the selectively outputting means so as to force said selectively outputting means to a condition of outputting the first subchannel signal irrespective of the control signal, when the second subchannel signal cannot be sensed.

2. A circuit claimed in claim 1 wherein the selectively outputting means includes an analog switch circuit having a first current mirror circuit connected to receive at its input current path the first subchannel signal, and a second current mirror circuit connected to receive at its input current path the second subchannel signal, an output transistor having an input connected commonly to one end of each of respective output paths of the first and second current mirror circuits, and means connected to another end of each of the output paths of the first and second current mirror circuits for selectively shunting either the first or second current mirror circuit in accordance with selection of the two subchannel signals.

3. A circuit claimed in claim 2 wherein the shunting means includes a balanced differential circuit having a control input and two outputs connected to the other ends of the output paths of the first and second current mirror circuits, respectively, the two outputs of the differential circuit being selectively grounded in accordance with the condition of the control input.

4. A circuit claimed in claim 3 wherein the means for controlling the selectively outputting means includes a first differential circuit having an input connected to the sensing means and two output paths which are alternatively rendered conductive in accordance with the condition of the input, and a second differential circuit connected to one of the two output paths of the first differential circuit so that it is put in an operable condition when the one output path of the first differential circuit is rendered conductive, the second differential circuit having an input connected to a manual switch for selection of the first and second subchannel signals, the second differential circuit also having two output paths, one of which is rendered conductive when the manual switch is in a first condition, and the other of which is rendered conductive when the manual switch is in a second condition, the one output path of the second differential circuit being adapted to be connected to the control input of the shunting means.

5. A circuit claimed in claim 4 wherein the sensing means is a detector for detecting a subcarrier for the second subchannel signal.

6. A circuit for demodulating a multivoice signal containing a main channel signal, a first subchannel signal, and a second subchannel signal, the latter two signals being treated for noise reduction, comprising first circuit means for extracting a main channel signal from the multivoice signal, second circuit means for extracting a first subchannel signal from the multivoice signal, third circuit means for extracting a second subchannel signal from the multivoice signal, switch circuit means receiving the first and second subchannel signals for selectively outputting one of the two subchannel signals, decoder means connected to an output of the switch circuit means to restore the original signal from the noise reduction treated signal, and output circuit means receiving the outputs of the first circuit means and the decoder means for generating an audio signal, the switch circuit means having a manual switch for selecting one of either the first and second subchannel signals, the switch circuit means further including means to invalidate selection of the second subchannel signal by the manual switch when the second subchannel signal cannot be sensed in the multivoice signal.

7. A circuit claimed in claim 6 wherein the switching means includes an analog switch circuit having a first current mirror circuit receiving at its input current path the first subchannel signal, and a second current mirror circuit receiving at its input current path the second subchannel signal, an output transistor having an input connected commonly to one end of each of respective output paths of the first and second current mirror circuits and an output connected to the decoder means, and means connected to the other end of each of the output paths of the first and second current mirror circuits for selectively shunting either the first or second current mirror circuit in accordance with selection of the two subchannel signals.

8. A circuit claimed in claim 7 wherein the shunting means includes a balanced differential circuit having a control input and two outputs connected to the other ends of the output paths of the first and second current mirror circuits, respectively, the two outputs of the differential circuit being selectively grounded in accordance with selection of the two subchannel signals.

9. A circuit claimed in claim 8 wherein the switch circuit also includes a first differential circuit having an input connected to the third circuit means and two output paths which are alternatively rendered conductive in accordance with the condition of the input, and a second differential circuit connected to one of the two output paths of the first differential circuit so that it is put in an operable condition when the one output path of the first differential circuit is rendered conductive, the second differential circuit having an input connected to a manual switch for selection of the first and second subchannel signals and two output paths, one of which is rendered conductive when the manual switch is in a first condition, and the other of which is rendered conductive when the manual switch is in a second condition, the one output path of the second differential circuit being adapted to be connected to the control input of the shunting means.

10. A circuit claimed in claim 6 wherein the main channel signal, the first subchannel signal and the second subchannel signal are a (L+R) signal, a (L−R) signal and an SAP signal, respectively, and wherein the first circuit means includes a low pass filter extracting the (L+R) signal from the multivoice signal, the second circuit means includes a pilot detector for detecting a pilot signal for the (L−R) signal from the multivoice signal and generating a (L−R) signal reception signal, and a (L−R) signal demodulator controlled by the pilot detector to reproduce the (L−R) signal from the multivoice signal; and the third circuit means includes a SAP subcarrier detector for detecting a subcarrier for the SAP signal from the multivoice signal and generating a SAP signal reception signal, and a SAP signal demodulator controlled by the subcarrier detector to reproduce the SAP signal from the multivoice signal.

11. A circuit claimed in claim 10 wherein the switch circuit includes an analog switch circuit having a first current mirror circuit connected to receive at its input current path the (L−R) signal, and a second current mirror circuit connected to receive at its input current path the SAP signal, an output transistor having an input connected commonly to one end of each of respective output paths of the first and second current mirror circuits, and means connected to the other end of each of the output paths of the first and second current mirror circuits for selectively shunting either the first or second current mirror circuit in accordance with selection of the two subchannel signals.

12. A circuit claimed in claim 11 wherein the shunting means includes a balanced differential circuit having a control input and two outputs connected to the other end of each of the output paths of the first and second current mirror circuits, respectively, the two outputs of the balanced differential circuit being selectively grounded according to the condition of a control input.

13. A circuit claimed in claim 12 wherein the balanced differential circuit includes a first transistor having a collector connected to the other end of the output path of the first current mirror circuit, a second transistor connected to the first transistor to form a first differential circuit, a third transistor having a collector connected to the other end of the output path of the second current mirror circuit, and a fourth transistor connected to the third transistor to form a second differential circuit, the first and fourth transistors being common-connected at their bases to the control input, and the second and third transistors being common-connected to a predetermined bias voltage, so that the first and third transistors are alternatively turned on in accordance with the voltage applied to the control input.

14. A circuit claimed in claim 12 wherein the switch circuit includes a first differential circuit having an input connected to the subcarrier detector and two output paths which are alternatively rendered conductive in accordance with the condition of the input, and a second differential circuit connected to one of the two output paths of the first differential circuit so that it is put in an operable condition when the one output path of the first differential circuit is rendered conductive, the second differential circuit having an input connected to a manual switch for selection of the first and second subchannel signals, the second differential circuit also having two output paths, one of which is rendered conductive when the manual switch is in a first condition, and the other of which is rendered conductive when the manual switch is in a second condition, the one output path of the second differential circuit being adapted to be connected to the control input of the shunting means.

15. A circuit claimed in claim 14 wherein the first differential circuit includes a first transistor having a base connected to the subcarrier detector, and a second transistor connected to the first transistor to form a differential circuit, the second transistor having a base connected to a predetermined bias voltage and a collector connected to a DC source voltage through one of two current paths of a third current mirror circuit, so that the first and second transistors are alternatively put on in accordance with the base potential of the first transistor, and wherein the second differential circuit includes third and fourth transistors connected to form another differential circuit, the emitters of the third and fourth transistors being common-connected to the other current path of the third current mirror circuit, the base of the third transistor being connected through a first resistor to a first bias voltage and also through second and third resistors and the manual switch to the DC source voltage, the collector of the third transistor being connected to a control input of the balanced differential switch circuit and also connected through a fourth resistor to a bias voltage, and the base of the fourth transistor being connected through a resistor to a second bias voltage.

16. A circuit claimed in claim 15 wherein the collector of the fourth transistor is connected through one of two current paths of a fourth current mirror circuit to said first bias voltage, the other current path of the fourth current mirror circuit and the first transistor being connected to one of two current paths of a fifth current mirror circuit, the other current path of the fifth current mirror circuit being connected to a stereo-/mono switch circuit whose output is connected to a stereo matrix circuit.

17. A switching circuit for treating a multivoice signal including a main channel and first and second subchannels for enabling both stereophonic information transmission and bilingual information transmission, the main channel and the first subchannel being used for stereophonic information, and the main channel and the second subchannel being respectively assigned to a first language and a second language for the bilingual information, the switching circuit comprising a first means responsive to a control signal for enabling one selected from the group consisting of the stereophonic reproduction, the first language reproduction and the second language reproduction, a second means sensing a second subchannel signal extracted from the multivoice signal, and a third means connected to the second means for controlling the first means so as to force said first means into a condition for enabling only either the stereophonic reproduction or the first language reproduction irrespective of the control signal when the second channel signal is not sensed.

18. A circuit claimed in claim 17 wherein the first means includes an analog switch circuit having a first current mirror circuit connected to receive at its input current path a first subchannel signal extracted from the multivoice signal, and a second current mirror circuit connected to receive at its input current path a second subchannel signal, an output transistor having an input connected commonly to one end of each of respective output paths of the first and second current mirror circuits, and means connected to the other end of each of the output paths of the first and second current mirror circuits for selectively shunting either the first or second current mirror circuit in accordance with selection of the two subchannel signals.

19. A circuit claimed in claim 18 wherein the shunting means includes a balanced differential circuit having a control input and two outputs connected to the other end of each of the output paths of the first and second current mirror circuits, respectively, the two outputs of the differential circuit being selectively grounded in accordance with the condition of the control input.

20. A circuit claimed in claim 19 wherein the third means includes a first differential circuit having an input connected to the second means and two output paths which are alternatively rendered conductive in accordance with the condition of the input, and a second differential circuit connected to one of the two output paths of the first differential circuit so that it is put in an operable condition when the one output path of the first differential circuit is rendered conductive, the second differential circuit having an input connected to a manual switch for selection of the first and second subchannel signals, the second differential circuit also having two output paths, one of which is rendered conductive when the manual switch is in a first condition, and the other of which is rendered conductive when the manual switch is in a second condition, the one output path of the second differential circuit being adapted to be connected to the control input of the shunting means.

21. A circuit for demodulating a multivoice signal containing a main channel signal, a first subchannel signal, and a second subchannel signal, the latter two signals being compressed in a DBX noise reduction system, the first subchannel being assigned to stereophonic information and the second subchannel being assigned to second language information, comprising first circuit means for extracting a main channel signal from the multivoice signal, second circuit means for extracting a first subchannel signal from the multivoice signal, third circuit means for extracting a second subchannel signal from the multivoice signal, switching circuit means receiving the first and second subchannel signals for selectively outputting one of the two subchannel signals, decoder means connected to an output of the switch circuit means to restore the original signal from the DBX noise reduction treated signal, and output circuit means receiving the outputs of the first circuit means and the decoder means for generating an audio signal, the switch circuit means having a manual switch for selecting either of the first and second subchannel signals, and the switch circuit means including means for invalidating selection of the second subchannel signal by the manual switch when the second subchannel signal cannot be sensed in the multivoice signal.

22. A circuit for demodulating a multivoice signal containing a main channel for a (L+R) signal, a first subchannel for a (L−R) signal, and a second subchannel for an SAP signal comprising:

a low pass filter extracting the (L+R) signal from the multivoice signal;

a pilot detector for detecting a pilot signal for the (L−R) signal from the multivoice signal and generating a (L−R) signal reception signal;

a (L−R) signal demodulator controlled by the pilot detector to reproduce the (L−R) signal from the multivoice signal;

a SAP subcarrier detector for detecting a subcarrier for the SAP signal from the multivoice signal and generating a SAP signal reception signal;

a SAP signal demodulator controlled by the subcarrier detector to reproduce the SAP signal from the multivoice signal;

a switching circuit means receiving the (L−R) and SAP signals for selectively outputting one of the subchannel signals;

a decoder means connected to an output of the switch circuit means to restore the original signal from the noise reduction treated signal; and output circuit means receiving the outputs of the low pass filter and the decoder means for generating an audio signal, the switch circuit means having a manual switch for selecting either of the (L−R) and SAP signals, and further includes means for invalidating selection of the SAP signal by the manual switch when the SAP signal cannot be sensed in the multivoice signal.

23. A circuit for demodulating a multivoice signal containing a main channel for a (L+R) signal, a first subchannel for a (L−R) signal, and a second subchannel for an SAP signal, the (L−R) signal and the SAP signal being treated to suppress, comprising:

a low pass filter extracting the (L+R) signal from the multivoice signal;

a pilot detector for detecting a pilot signal for the (L−R) signal from the multivoice signal and generating a (L−R) signal reception signal;

a (L−R) signal demodulator controlled by the pilot detector to reproduce the (L−R) signal from the multivoice signal;

a SAP subcarrier detector for detecting a subcarrier for the SAP signal from the multivoice signal and generating a SAP signal reception signal;

a SAP signal demodulator controlled by the subcarrier detector to reproduce the SAP signal from the multivoice signal;

an analog switch circuit having a first current mirror circuit connected to receive at its input current path the (L−R) signal, and a second current mirror circuit connected to receive at its input current path the SAP signal, an output transistor having an input connected commonly to one end of each of respective output paths of the first and second mirror circuits;

a balanced differential circuit including a first transistor having a collector connected to the other end of the output paths of the first current mirror circuit, a second transistor connected to the first transistor to form a first differential circuit, a third transistor having a collector connected to the other end of the output paths of the second current mirror circuit, and a fourth transistor connected to the third transistor to form a second differential circuit, the first and fourth transistors being common-connected at their bases to a control input for selection of the (L−R) signal and the SAP signal, and the second and third transistors being common-connected to a predetermined bias voltage, so that the first and third transistors are alternatively turned on in accordance with the voltage applied to the control input;

a decoder connected to an output of the output transistor of the analog switch circuit to restore the original signal from the noise reduction treated signal; and an output circuit receiving the outputs of the low pass filter and the decoder for generating an audio signal.

24. A circuit for demodulating a multivoice signal containing a main channel for a (L+R) signal, a first subchannel for a (L−R) signal, and a second subchannel for an SAP signal, the (L−R) signal and the SAP signal being suppressed for noise reduction, comprising:

a low pass filter extracting the (L+R) signal from the multivoice signal;

a pilot detector for detecting a pilot signal for the (L−R) signal from the multivoice signal and generating a (L−R) signal reception signal;

a (L−R) signal demodulator controlled by the pilot detector to reproduce the (L−R) signal from the multivoice signal;

a SAP subcarrier detector for detecting a subcarrier for the SAP signal from the multivoice signal and generating a SAP signal reception signal;

a SAP signal demodulator controlled by the subcarrier detector to reproduce the SAP signal from the multivoice signal;

an analog switch circuit having a first current mirror circuit connected to receive at its input current path the (L−R) signal, and a second current mirror circuit connected to receive at its input current path the SAP signal, an output transistor having an input connected commonly to one end of each of respective output paths of the first and second current mirror circuits;

a balanced differential switch circuit including a first transistor having a collector connected to the other end of the output paths of the first current mirror circuit, a second transistor connected to the first transistor to form a first differential circuit, a third transistor having a collector connected to the other end of the output path of the second current mirror circuit, and a fourth transistor connected to the third transistor to form a second differential circuit, the first and fourth transistors being common-connected at their bases to a control input for selection of the (L−R) signal and the SAP signal, and the second and third transistors being common-connected to a predetermined bias voltage, so that the first and third transistors are alternatively turned on in accordance with the voltage applied to the control input;

a decoder connected to an output of the output transistor of the analog switch circuit to restore the original signal from the noise reduction treated signal;

third differential circuit including a fifth transistor having a base connected to the subcarrier detector, and a sixth transistor connected to the fifth transistor to form a differential circuit, the sixth transistor having a base connected to a predetermined bias voltage and a collector connected to a DC source voltage through one of two current paths of a third current mirror circuit, so that the fifth and sixth transistors are alternatively put on in accordance with the base potential of the fifth transistor;

a fourth differential circuit including seventh and eighth transistors connected to form another differential circuit, the emitters of the seventh and eighth transistors being common-connected to the other current path of the third current mirror circuit, the base of the seventh transistor being connected through a first resistor to a first bias voltage and also through second and third resistors and a manual switch to the DC source voltage, the collector of the seventh transistor being connected to the control input of the balanced differential switch circuit and also connected through a fourth resistor to a second bias voltage, and the base of the eighth transistor being connected through a resistor to a third bias voltage, the collector of the eighth transistor is connected through one current path of a fourth current mirror circuit to said predetermined bias voltage, another current path of the fourth current mirror circuit and the fifth transistor being connected to one current path of a fifth current mirror circuit, another current path of the fifth current mirror circuit being connected to a stereo/mono switch circuit; and a stereo matrix circuit receiving the (L+R) signal and the output of the decoder and controlled by an output of the stereo-mono switch circuit and the potential of the collector of the seventh transistor so as to form a pair of audio outputs in one of a monoral mode, a stereophonic mode and a SAP mode.

* * * * *

UNITED STATES PATENT AND TRADEMARK OFFICE
CERTIFICATE OF CORRECTION

PATENT NO. : 4,716,589
DATED : December 29, 1987
INVENTOR(S) : MATSUI

It is certified that error appears in the above-identified patent and that said Letters Patent is hereby corrected as shown below:

COLUMN 1, LINE 23   Delete "transmits" and insert --transmit--;

COLUMN 4, LINE 28   Delete "detector 22" and insert --detector 32--;

COLUMN 6, LINE 39   Delete "$Q_3$ and $Q_4$" and insert --$Q_3$ and $Q_5$--;

COLUMN 10, LINE 52  Delete "withi" and insert --within--.

Signed and Sealed this

Thirtieth Day of August, 1988

Attest:

DONALD J. QUIGG

*Attesting Officer*  *Commissioner of Patents and Trademarks*